(12) United States Patent
Ota et al.

(10) Patent No.: US 6,811,846 B1
(45) Date of Patent: Nov. 2, 2004

(54) LAMINATED PLASTIC MOLDED BODY

(75) Inventors: Akiho Ota, Isehara (JP); Masato Suzuki, Isehara (JP); Minoru Abe, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 09/720,488

(22) PCT Filed: May 12, 2000

(86) PCT No.: PCT/JP00/03059

§ 371 (c)(1), (2), (4) Date: Mar. 5, 2001

(87) PCT Pub. No.: WO00/69627

PCT Pub. Date: Nov. 23, 2000

(30) Foreign Application Priority Data

May 12, 1999 (JP) .......................... 11/131123

(51) Int. Cl.⁷ ................................ B85D 1/02
(52) U.S. Cl. .................... 428/35.9; 428/34.1; 428/35.7; 428/423.7
(58) Field of Search ............... 428/34.1, 35.7, 428/35.9, 423.7

(56) References Cited

U.S. PATENT DOCUMENTS 4,496,408 A * 1/1985 Hahn ........................ 156/73.5
4,778,842 A * 10/1988 Taniguchi et al. .......... 524/504

FOREIGN PATENT DOCUMENTS

| EP | 0 753 862 A1 | 1/1997 |
|---|---|---|
| JP | 5-64865 | 3/1993 |
| JP | 05064865 A | 3/1993 |
| JP | 06285960 A | 10/1994 |
| JP | 6-285960 | 10/1994 |
| JP | 06-285960 | * 10/1994 |
| JP | 7-80919 A | 3/1995 |
| JP | 07-080919 | * 3/1995 |
| JP | 07-266517 | * 10/1995 |
| JP | 07266517 A | 10/1995 |
| JP | 7-2665147 | 10/1995 |

* cited by examiner

Primary Examiner—Harold Pyon
Assistant Examiner—Brian P Egan
(74) Attorney, Agent, or Firm—Oliff & Berridge, PLC

(57) ABSTRACT

The laminated plastic molded body of the present invention comprises a three-layered or five-layered laminated plastic molded body in which a resin layer A and a resin layer B are laminated alternately, and the resin layer A is a poly(ethylene terephthalate) resin layer, and the resin layer B interposed between said resin layers A is a polyolefin resin layer having a cyclic olefin component. Thereby, a laminated plastic molded body for general use having high degree of barrier properties to humidity, and yet excellent transparency and oxygen barrier properties, and having excellent resistant to vegetable type or mineral type oils or greases can be provided.

10 Claims, 1 Drawing Sheet

LAMINATED PLASTIC MOLDED BODY

TECHNICAL FIELD

This invention relates to laminated plastic molded bodies such as cylindrical bodies constituting trunk portions of bottle shaped plastic containers or tube containers.

BACKGROUND ART

Various kinds of plastic containers have been on the market as a container for, for example, foods, drinks, cosmetics, chemicals or the like, since they have a light weight, a lower danger of breakage, a low cost and the like. For example, plastic containers made of polyolefin resins such as polypropylene, etc. have been used as containers for general purpose having barrier properties against humidity. Also, plastic containers made of poly(ethylene terephthalate) resins have excellent transparency and oxygen barrier properties, and have been used as containers for various kinds of beverages having beautiful appearance similar to glass bottles.

Moreover, as transparent containers having barrier properties to humidity, stretch blow molded containers using polyolefin resin containing a cyclic olefin component have been proposed (JP-A-7-80919).

DISCLOSURE OF THE INVENTION

However, plastic containers using polyolefin resins such as polypropylene and the like as mentioned above are insufficient in transparency. Also, plastic containers using poly(ethylene terephthalate) resin are insufficient in barrier properties against humidity.

Moreover, the above-mentioned stretch blow molded containers using polyolefin resin containing a cyclic olefin component are poor in stress characteristics, and poor in resistance against vegetable type or mineral type oils or greases. Particularly when residual stress remained in the containers themselves, adhesion of oils at fingers, etc. to the containers may cause crazing or cracking. Also, since a cost of the polyolefin resin containing a cyclic olefin component, which is a starting material for molding, is about ten times that of the poly(ethylene terephthalate) resin, the resin can not be used to make general purpose plastic molded bodies from the viewpoint of its cost.

Thus, a transparent container which is a container for containing, for example, chemicals or cosmetics, etc., which contains a component a function of which is lowered by hygroscopicity, and has excellent characteristics including resistance to vegetable type or mineral type oils or greases cannot be prepared by using the above-mentioned polyolefin type resin such as polypropylene, etc. or the polyethylene terephthalate resin, or a polyolefin resin having a cyclic olefin component.

Accordingly, an object of the present invention is to provide a laminated plastic molded body for general purpose, which is suitable for making a container for containing chemicals or cosmetics, etc., particularly containing a component an action of which is decreased by absorbing humidity, i.e., which is a laminated plastic molded body having an extremely high degree of barrier properties against humidity and excellent transparency and oxygen barrier properties, and also having excellent properties in resistance to vegetable type or mineral type oils or greases.

The above-mentioned problems can be solved by the laminated plastic molded body of the present invention comprising the constitution as mentioned below.

That is, the present invention relates to a three-layered or five-layered multi-layer laminated plastic molded body in which a resin layer A and a resin layer B are laminated alternately, and the resin layer A is a poly(ethylene terephthalate) resin layer, and the resin layer B interposed between said resin layers A is a polyolefin resin layer having a cyclic olefin component.

Also, in the three-layered or five-layered multi-layer laminated plastic body in which a resin layer A and a resin layer B are alternately laminated of the present invention having the above-mentioned constitution, it is preferred that the total weight of the poly(ethylene terephthalate) resin constituting the resin layer A is 95 to 55% by weight and the total weight of the polyolefin resin layer having the cyclic olefin component constituting the resin layer B is 5 to 45% by weight.

In the laminated plastic molded body of the present invention, by making the total weight of the poly(ethylene terephthalate) resin layer constituting the resin layer A 95 to 55% by weight, and the total weight of the polyolefin resin layer having the cyclic olefin component constituting the resin layer B 5 to 45% by weight, a laminated plastic molded body in which a cost of the raw resins for molding does not become so expensive, and degrees of lowering in transparency or oxygen barrier properties are a little as compared with the plastic made of a poly(ethylene terephthalate) resin, and it has an extremely high barrier properties against humidity can be prepared.

The laminated plastic molded body of the present invention according to the above constitution is preferably a plastic container comprising a hollow biaxially drawn blow molded body, or a plastic container comprising a hollow blow molded body.

Also, the laminated plastic molded body of the present invention having the above-mentioned constitution is preferably a cylindrical body constituting a trunk portion of a tube container.

As the poly(ethylene terephthalate) resin to be used for forming the resin layer A constituting inside and outside surface layers of the laminated plastic molded body of the present invention, preferably used is a polyester resin in which 80 mol % or more, preferably 90 mol % or more of the dicarboxylic acid component constituting the polymer is terephthalic acid, and 80 mol % or more, preferably 90 mol % or more of the dialcohol component is ethylene glycol unit.

The polyolefin resin having a cyclic olefin component to be used for formation of the resin layer B interposed between the resin layers A is, for example, an addition polymer of a cyclic olefin and an α-olefin, or a hydrogenated product of a ring-opened polymer of the cyclic olefin (for example, available from Nippon Zeon Co., Ltd.: Zeonex (registered trademark), available from JSR: Arton (registered trademark)), etc. As an addition polymer of the cyclic olefin and the α-olefin, a polymer containing the cyclic olefin component with a ratio of 5 to 60 mol % or so is suitable.

As the cyclic olefin, there may be preferably mentioned, for example, norbornene; bicyclo[2.2.1]hept-2-ene), ethylidenenorbornene; ethylidenebicyclo[2.2.1]hept-2-ene, 6-methylbicyclo[2.2.1]hept-2-ene, 5,6-dimethylbicyclo[2.2.1]hept-2-ene, 1-methylbicyclo[2.2.1]hept-2-ene, 6-ethylbicyclo[2.2.1]hept-2-ene, 6-butylbicyclo[2.2.1]hept-2-ene, 6-isobutylbicyclo[2.2.1]hept-2-ene, 7-methylbicyclo[2.2.1]hept-2-ene, tetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-propyltetracyclo[4.4.0.1$^{2,5}$.1$^{7,10}$]-3-dodecene, 8-hexyltetracyclo[4.4.0.1$^{2,5}$.1$^{7,10}$]-3-dodecene, 8-stearyltetracyclo[4.4.0.1$^{2,5}$.1$^{7,10}$]-3-dodecene, 8,9-dimethyltetracyclo[4.4.0.1$^{2,5}$.1$^{7,10}$]-3-dodecene, 8-methyl-9-ethyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo[4.4.0.1$^{2,5}$.1$^{7,10}$]-3-dodecene, 8-fluorotetracyclo[4.4.0.1$^{2,5}$.1$^{7,10}$]-3-dodecene, 8,9-dichlorotetracyclo[4.4.0.1$^{2,5}$.1$^{7,10}$]-3-dodecene, 8-cyclohexyltetracyclo[4.4.0.1$^{2,5}$.1$^{7,10}$]-3-dodecene, 8-isobutyltetracyclo[4.4.0.1$^{2,5}$.1$^{7,10}$]-3dodecene, 8-butyltetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-ethylidene-9-methyltetracyclo[4.4.0.1$^{2,5}$.1$^{7,10}$]-3-dodecene, 8-ethylidene-9-ethyltetracyclo[4.4.0.1$^{2,5}$.1$^{7,10}$]-3-dodecene, 8-ethylidene-9-isopropyltetracyclo[4.4.0.1$^{2,5}$.1$^{7,10}$]- 3-dodecene, 8-ethylidene-9-butyltetracyclo[4.4.0.1$^{2,5}$.1$^{7,10}$]-3-dodecene, 8-n-propylidenetetracyclo[4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene, 8-isopropylidenetetracyclo[4.4.0.1$^{2,5}$.1$^{7,10}$]-3-dodecene, 8-isopropylidene-9-methyltetracyclo[4.4.0.1$^{2,5}$.1$^{7,10}$]-3-dodecene, 8-isopropylidene-9-ethyltetracyclo[4.4.0.1$^{2,5}$.1$^{7,10}$]-3-dodecene, 8-isopropylidene-9-isopropyltetracyclo[4.4.0.1$^{2,5}$.1$^{7,10}$]-3-dodecene, 8-isopropylidene-9-butyltetracyclo[4.4.0.1$^{2,5}$.1$^{7,10}$]-3-dodecene, 5,10-dimethyltetracyclo[4.4.0.1$^{2,5}$.1$^{7,10}$]-3-dodecene, 2,10-dimethyltetracyclo[4.4.0.1$^{2,5}$.1$^{7,10}$]-3-dodecene, 11,12-dimethyltetracyclo[4.4.0.1$^{2,5}$.1$^{7,10}$]-3-dodecene, 2,7,9-trimethyltetracyclo[4.4.0.1$^{2,5}$.1$^{7,10}$]-3-dodecene, 9-ethyl-2,7-dimethyltetracyclo[4.4.0.1$^{2,5}$.1$^{7,10}$]-3-dodecene, 9-isobutyl-2,7-dimethyltetracyclo[4.4.0.1$^{2,5}$.1$^{7,10}$]-3-dodecene, 9,11,12-trimethyltetracyclo[4.4.0.1$^{2,5}$.1$^{7,10}$]-3-dodecene, 9-ethyl-11,12-dimethyltetracyclo[4.4.0.1$^{2,5}$.1$^{7,10}$]-3-dodecene, 9-isobutyl-11,12-dimethyltetracyclo[4.4.0.1$^{2,5}$.1$^{7,10}$]-3-dodecene, 5,8,9,10-tetramethyltetracyclo[4.4.0.1$^{2,5}$.1$^{7,10}$]-3-dodecene, hexacyclo[6.6.1.1$^{3,6}$.1$^{10,13}$.0$^{2,7}$.0$^{9,14}$]-4-heptadecene, 12-methylhexacyclo[6.6.1.1$^{3,6}$.1$^{10,13}$.0$^{2,7}$.0$^{9,14}$]-4-heptadecene, 12-ethylhexacyclo[6.6.1.1$^{3,6}$.1$^{10,13}$.0$^{2,7}$.0$^{9,14}$]-4-heptadecene, 12-isobutylhexacyclo[6.6.1.1$^{3,6}$.1$^{10,13}$.0$^{2,7}$.0$^{9,14}$]-4-heptadecene, 1,6,10-trimethyl-12-isobutylhexacyclo[6.6.1.1$^{3,6}$.1$^{10,13}$.0$^{2,7}$.0$^{9,14}$]-4-heptadecene, octacyclo[8.8.0.1$^{2,9}$.1$^{4,7}$.1$^{11,18}$.1$^{13,16}$.0$^{3,8}$.0$^{12,17}$]-5-docosene, 15-methyloctacyclo[8.8.0.1$^{2,9}$.1$^{4,7}$.1$^{11,18}$.1$^{13,16}$.0$^{3,8}$.0$^{12,17}$]-5-docosene, 15-ethyloctacyclo[8.8.0.1$^{2,9}$.1$^{4,7}$.1$^{11,18}$.1$^{13,16}$.0$^{3,8}$.0$^{12,17}$]-5-docosene, pentacyclo[6.6.1.1$^{3,6}$.0$^{2,7}$.0$^{9,14}$]-4-hexadecene, 1,3-dimethylpentacyclo[6.6.1.1$^{3,6}$.0$^{2,7}$.0$^{9,14}$]-4-hexadecene, 1,6-dimethylpentacyclo[6.6.1.1$^{3,6}$.0$^{2,7}$.0$^{9,14}$]-4-hexadecene, 15,16-dimethylpentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, 1,3-dimethylpentacyclo[6.5.1.1$^{3,6}$.0$^{2,7}$.0$^{9,13}$]-4-4-pentadecene, 1,6-dimethylpentacyclo[6.5.1.1$^{3,6}$.0$^{2,7}$.0$^{9,13}$]-4-pentadecene, 14,15-dimethylpentacyclo[6.5.1.1$^{3,6}$.0$^{2,7}$.0$^{9,13}$]-4-pentadecene, heptacyclo[8.7.0.1$^{2,9}$.1$^{4,7}$.1$^{1,17.03,8}$.0$^{12,16}$]-5-eicosene, heptacyclo[8.8.0.1$^{2,9}$.1$^{4,7}$.1$^{1,18.03,8}$.0$^{12,17}$]-5-heneicosene, tricyclo[4.3.0.1$^{2,5}$]-3-decene, 2-methyltricyclo[4.3.0.1$^{2,5}$]-3-decene, 5-methyltricyclo[4.3.0.1$^{2,5}$]-3-decene, tricyclo[4.4.0.1$^{2,5}$]-3-undecene, 10-methyltricyclo[4.4.0.1$^{2,5}$]-3-undecene, pentacyclo[6.5.1.1$^{3,6}$.0$^{2,7}$.0$^{9,13}$]-4,10-pentadecadiene, pentacyclo[4.7.0.1$^{2,5}$.0$^{8,13}$.1$^{9,12}$]-3-pentadecene, methyl-substituted pentacyclo[4.7.0.1$^{2,5}$.0$^{8,13}$.1$^{9,12}$]-3pentadecene, heptacyclo[7.8.0.1$^{3,5}$.0$^{2,7}$.1$^{10,17}$.0$^{11,16}$.1$^{12,15}$]-4-eicosene, nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene, trimethyl-substituted nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene, 5-phenyl-bicyclo[2.2.1]hept-2-ene, 5-methyl-5-phenyl-bicyclo[2.2.1]hept-2-ene, 5-benzyl-bicyclo[2.2.1]hept-2-ene, 5-tolyl-bicyclo[2.2.1]hept-2-ene, 5-ethylphenyl-bicyclo[2.2.1]hept-2-ene, 5-isopropylphenyl-bicyclo[2.2.1]hept-2-ene, 1,4-methano-1,1a,4,4a-tetrahydrofluorene, 1,4-methano-1,4,4a,5,10,10a-hexahydroanthracene, cyclopentadiene-acenaphthylene adduct, 5-[α-naphthyl]-bicyclo[2.2.1]hept-2-ene, 5-(acetoracenyl)-bicyclo[2.2.1]hept-2-ene, etc.

As the α-olefin, preferred are, including ethylene, an α-olefin having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene, 1-eicosene, etc.

An addition polymer with a polyolefin having a cyclic olefin component is a copolymer containing the above-mentioned cyclic olefin component and the ethylene type component as essential components, but in addition to the above components, an unsaturated monomer component capable of copolymerizing with these may be further copolymerized. As the other unsaturated monomer capable of copolymerizing at this time, there may be mentioned a cyclic diene compound such as dicyclopentadiene, etc.

The laminated plastic molded body of the present invention according to the above-mentioned constitution can be molded by the same molding means as the molding of the conventional laminated plastic molded body of the poly (ethylene terephthalate) resin layer and the other thermoplastic resin layer, i.e., by an injection molding or a coextrusion molding, etc. Also, it may be a secondary molded body which utilizes the primary molded body molded by these molding means.

For example, when a laminated plastic molded body being a hollow container is to be made, a parison previously molded by a direct blow molding, or an injection molding or coextrusion molding, etc. is subjected to a secondary molding such as a blow molding or a biaxially drawn blow molding, etc., thereby molding can be carried out. It is preferred to make a hollow container comprising a laminated plastic molded body by a biaxially drawn blow molding since more preferred mechanical properties could be obtained.

Also, when a cylindrical shaped body which constitutes a tube container body portion is to be prepared, a predetermined laminated plastic sheet obtained by a coextrusion molding is further subjected to molding of the tube container body portion so that it is rounded off into a cylindrical shape.

BEST MODE FOR CARRYING OUT THE INVENTION

Figure 1:
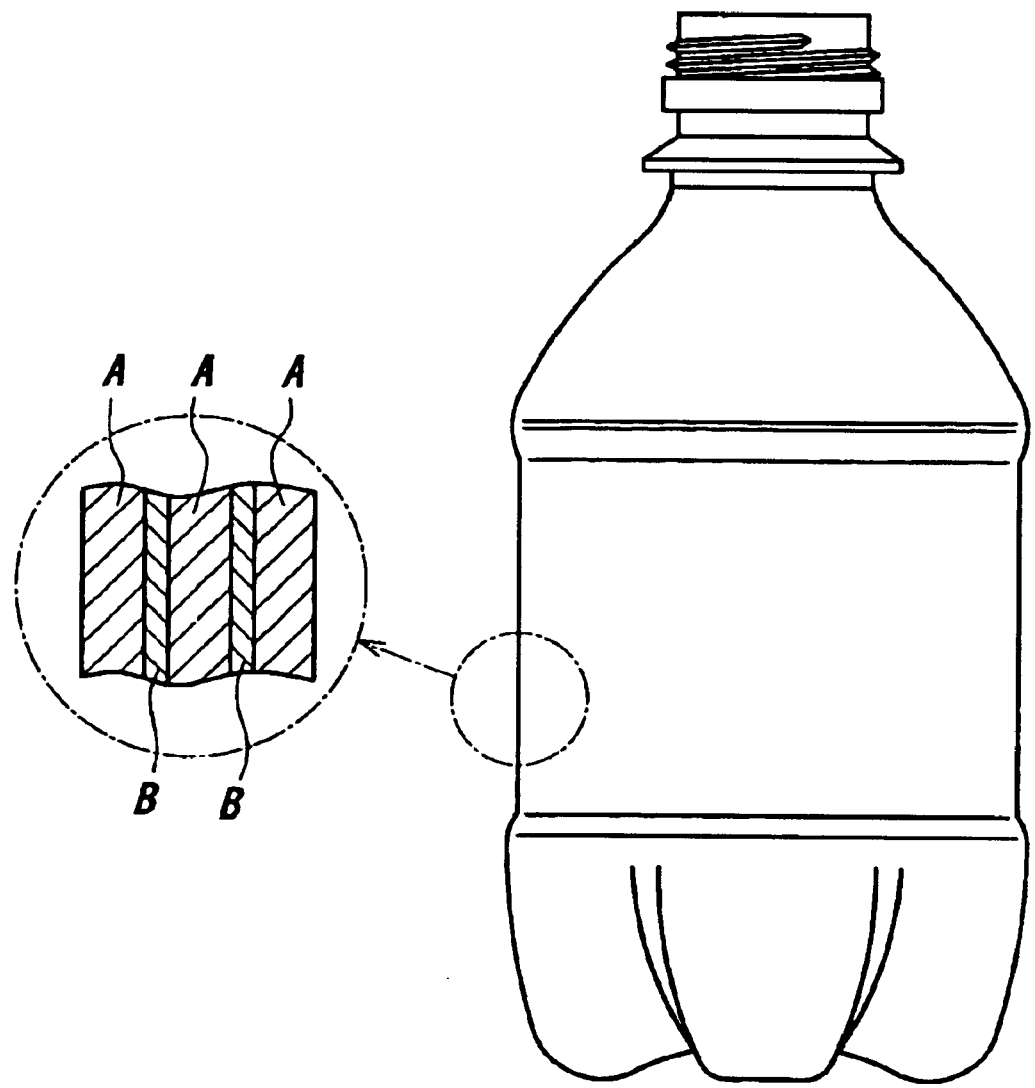
FIG. 1 is a front view showing schematic shape of a container comprising a multi-layer laminated plastic molded body molded in Example 1.

In the following, specific constitution of the laminated plastic molded body of the present invention will be explained by referring to preparation examples, and barrier properties, etc. against humidity of said laminated plastic molded body are also explained.

EXAMPLE 1

A poly(ethylene terephthalate) resin (available from Nippon Unipet Co., Ltd.: RT-543SR) was used as a resin for forming a resin layer A, and a polyolefin type resin (available from Mitsui Kagaku Co., Ltd.: APEL) comprising a copolymer of a cyclic olefin component which is tetracyclo $[4.4.0.1^{2,5}.1^{7,10}]$-3-dodecene or a derivative thereof and an α-olefin was used as a resin for forming a resin layer B, a parison having a bottom comprising a five-layered structure of a resin layer A (First layer)-a resin layer B (Second layer)-a resin layer A (Third layer)-a resin layer B (Fourth layer)-a resin layer A (Fifth layer) with a length of 10 cm (including a bottle-neck portion) and a weight of 32 g (Resin A: 28.8 g, Resin B: 3.2 g) was prepared by the injection molding.

Incidentally, an injection molding temperature of the resin A was made 285° C. and an injection molding temperature of the resin B was made 220° C. to 240° C., layer thicknesses of the first layer, the third layer and the fifth layer were made equal and layer thicknesses of the second layer and the fourth layer were made equal, respectively.

Then, the above-mentioned parison having the bottom was subjected to biaxially drawn blow molding in a mold for blow molding to obtain a container comprising a multi-layer laminated plastic molded body and having a volume of 500 ml, a height of 20 cm, and a diameter at the center portion in the lengthwise direction at the center of the body portion for adhering a label of 6.7 cm with an outline shape shown in FIG. 1.

COMPARATIVE EXAMPLE 1

A parison having a bottom and made of a poly(ethylene terephthalate) resin (available from Nippon Unipet Co., Ltd.: RT-543SR) with a weight of 32 g was molded by an injection molding, and then, said parison was subjected to biaxially drawn blow molding in the same manner as in Example 1 to obtain a plastic container having a volume of 500 ml for comparison.

<Experiment 1>

Water transmission amounts (g) of the respective plastic containers obtained in the above-mentioned Example 1 and Comparative example 1 were measured by filling calcium carbonate for measuring water content in the respective containers under atmosphere of 40° C. and 75% RH. The results are shown in the following Table 1.

Table 1

TABLE 1

| Number of days allowed to stand | 1 | 7 | 14 | 28 | 45 | 84 |
|---|---|---|---|---|---|---|
| Example 1 | 0.032 | 0.19 | 0.368 | 0.668 | 1.06 | 1.96 |
| Comparative example 1 | 0.05 | 0.37 | 0.702 | 1.348 | 2.154 | 4.03 |

EXAMPLE 2

A poly(ethylene terephthalate) resin (available from Nippon Unipet Co., Ltd.: RT-543SR) was used as a resin for forming a resin layer A, and a polyolefin type resin (available from Mitsui Kagaku Co., Ltd.: APEL) comprising a copolymer of a cyclic olefin component which is tetracyclo $[4.4.0.1^{2,5}.1^{7,10}]$-3-dodecene or a derivative thereof and an α-olefin was used as a resin for forming a resin layer B, a parison having a bottom comprising a five-layered structure of a resin layer A (First layer)-a resin layer B (Second layer)-a resin layer A (Third layer)-a resin layer B (fourth layer)-a resin layer A (Fifth layer) with a length of 60 mm (including a bottle-neck portion) and a weight of 13.1 g (Resin A: 11.53 g, Resin B: 1.57 g) was prepared by the injection molding.

Incidentally, an injection molding temperature of the resin A was made 290° C. and an injection molding temperature of the resin B was made 220° C. to 240° C., layer thicknesses of the first layer, the third layer and the fifth layer were made equal and layer thicknesses of the second layer and the fourth layer were made equal, respectively.

Then, the above-mentioned parison having a bottom was subjected to biaxially drawn blow molding in a mold for blow molding to obtain a container comprising a multi-layer laminated plastic molded body corresponding to No. 5 standard bottle having a volume of 50 ml.

A poly(ethylene terephthalate) resin (available from Nippon Unipet Co., Ltd.: RT-543SR) was used as a resin for forming a resin layer A, and a polyolefin type resin (available from Mitsui Kagaku Co., Ltd.: APEL) comprising a copolymer of a cyclic olefin component which is tetracyclo $[4.4.0.1^{2,5}.1^{7,10}]$-3-dodecene or a derivative thereof and an α-olefin was used as a resin for forming a resin layer B, a parison having a bottom comprising a three-layered structure of a resin layer A (First layer)-a resin layer B (Second layer)-a resin layer A (Third layer) with a length of 60 mm (including a bottle-neck portion) and a weight of 12.9 g (Resin A: 10.54 g, Resin B: 2.45 g) was prepared by the injection molding.

Incidentally, an injection molding temperature of the resin A was made 290° C. and an injection molding temperature of the resin B was made 220° C. to 240° C., layer thicknesses of the first layer, the third layer and the fifth layer were made equal and layer thicknesses of the second layer and the fourth layer were made equal, respectively.

Then, the above-mentioned parison having the bottom was subjected to biaxially drawn blow molding in a mold for blow molding to obtain a container comprising a multi-layer laminated plastic molded body corresponding to No. 5 standard bottle having a volume of 50 ml.

COMPARATIVE EXAMPLE 2

A parison having a bottom and made of a poly(ethylene terephthalate) resin (available from Nippon Unipet Co., Ltd.: RT-543SR) with a weight of 13.8 g was molded by an injection molding, and then, said parison was subjected to biaxially drawn blow molding in the same manner as in Example 2 to obtain a plastic container corresponding to No. 5 standard bottle having a volume of 50 ml.

<Experiment 2>

Water transmission amounts (g) of the respective plastic containers obtained in the above-mentioned Example 2, Example 3 and Comparative example 2 were measured by filling calcium carbonate for measuring water content in the respective containers under atmosphere of 40° C. and 75% RH. The results are shown in the following Table 2.

TABLE 2

| Number of days allowed to stand | 7 | 14 | 21 | 35 | 84 |
| --- | --- | --- | --- | --- | --- |
| Example 2 | 0.026 | 0.039 | 0.057 | 0.086 | 0.169 |
| Example 3 | 0.021 | 0.029 | 0.040 | 0.056 | 0.107 |
| Comparative example 2 | 0.062 | 0.103 | 0.160 | 0.250 | 0.503 |

COMPARATIVE EXAMPLE 3

A parison having a bottom and made of a polyolefin type resin (available from Mitsui Kagaku Co., Ltd.: APEL) which comprises a copolymer of a cyclic olefin component which is tetracyclo[$4.4.0.1^{2,5}.1^{7,10}$]-3-dodecene or a derivative thereof and an α-olefin with a weight of 8.9 g was molded by an injection molding, and then, said parison was subjected to biaxially drawn blow molding in the same manner as in Example 2 to obtain a plastic container for comparison corresponding to No. 5 standard bottle having a volume of 50 ml.

<Experiment 3>

Oxygen transmission amounts (cc/day·Bottle) of the respective plastic containers obtained in the above-mentioned Example 2 to Example 3 and Comparative example 2 to Comparative example 3 were measured by each setting the atmosphere at the outside said plastic containers to 23° C. and 55% RH and the atmosphere in the respective plastic containers to 23° C. and 100% RH. The obtained results are shown in the following Table 3 with an oxygen transmission coefficient (cc·mm/mm²·day·atm) calculated from the oxygen transmission amount. Incidentally, a thickness (min) of the plastic container is an average value of the trunk portion from the bottleneck portion of said plastic container to the grounded portion.

TABLE 3

| No. | Oxygen transmission amount | Oxygen transmission coefficient | Thickness |
| --- | --- | --- | --- |
| Example 2 | 0.004 | 3.2 | 1.18 |
| Example 3 | 0.005 | 4.2 | 1.25 |
| Comparative example 2 | 0.003 | 2.5 | 1.22 |
| Comparative example 3 | 0.029 | 18.8 | 0.958 |

COMPARATIVE EXAMPLE 4

A plastic container corresponding to No. 5 standard bottle having a volume of 50 ml for comparison was obtained from a polypropylene resin (available from Grand Polymer Co., Ltd.: IBY009 (transparent grade)) in the same manner as in Comparative example 3.

<Experiment 4>

Transparency (Heize degree) at the trunk portion of the respective plastic containers obtained in the above-mentioned Example 2 to Example 3 and Comparative example 2 to Comparative example 4 were measured by utilizing SQ-300H NDH sensor manufactured by Nippon Denshoku Kogyo Co., Ltd. The obtained results are shown in the following Table 4 with thicknesses at the measured portion of the respective plastic containers. Incidentally, the thickness (mm) at the measured portion of the respective plastic containers is an average value at the four portions around the measured portion (light flux portion: φ12 mm) of the Heize degree.

TABLE 4

| No. | Heize degree | Thickness |
| --- | --- | --- |
| Example 2 | 4.94 | 1.31 |
| Example 3 | 2.99 | 1.08 |
| Comparative example 2 | 2.29 | 1.11 |
| Comparative example 3 | 1.04 | 1.02 |
| Comparative example 4 | 14.9 | 1.15 |

Industrial Applicability

According to the present invention, a laminated plastic molded body having an excellent transparency and oxygen barrier properties provided by the resin layer A and a high degree of moisture permeability resistance provided by the resin layer B can be provided.

Also, the polyolefin resin layer (resin layer B) containing a cyclic olefin component which is poor in stress characteristics is interposed between the resin layers A and it does not become surface layers at the outside and inside of the laminated plastic molded body so that the problem based on it can be avoided. That is, a problem of resistance to a vegetable type or mineral type oils or greases, particularly when the plastic molded material itself has a residual stress, adhesion of oils, etc. to the container, at the tope of fingers causes crazing or cracking, can be avoided.

Moreover, the laminated plastic molded body according to the present invention is cutting down an amount of the used polyolefin resin containing a cyclic olefin component which is expensive in a cost of starting materials by the laminated structure of two kinds of resin layers, so that it is economically advantageous whereby it can be used in the field of general use.

From the reasons as mentioned above, the laminated plastic molded body according to the present invention can be made a transparent container having extremely excellent preservation properties by making an container particularly for containing chemicals or cosmetics containing a component a function of which is lowered by hygroscopicity.

What is claimed is:

1. A laminated plastic molded body being a three-layered or five-layered laminated plastic molded body in which a resin layer A and a resin layer B are laminated alternately, and the resin layer A is a poly(ethylene terephthalate) resin layer, and the resin layer B interposed between said resin layers A is a polyolefin resin layer having a cyclic olefin component, wherein the total weight of the laminated resin layers A and B comprises 95 to 55% by weight of the poly(ethylene terephthalate) resin constituting the resin layer A and 5 to 45% by weight of the polyolefin resin layer having the cyclic olefin component constituting the resin layer B.

2. A laminated plastic molded body according to claim 1, wherein said plastic molded body is a plastic container comprising a hollow blow molded body.

3. A laminated plastic molded body according to claim 1, wherein said plastic molded body is a cylindrical body constituting a trunk portion of a tube container.

4. A laminated plastic molded body according to claim 1, wherein said laminated plastic molded body is a plastic container comprising a hollow biaxially drawn blow molded body.

5. A laminated plastic molded body according to claim 1, wherein said plastic molded body is a plastic container comprising a hollow blow molded body.

6. A laminated plastic molded body according to claim 1, wherein said plastic molded body is a cylindrical body constituting a trunk portion of a tube container.

7. A laminated plastic molded body according to claim 1, wherein said resin layer B comprises at least one member selected from the group consisting of an addition polymer of a cyclic olefin and an α-olefin, and a hydrogenated product of a ring-opened polymer of a cyclic olefin.

8. A laminated plastic molded body according to claim 1, wherein said cyclic olefin component is selected from the group consisting of norbornene, bicycle(2.2.1)hept-2-ene, ethylidenenorbornene, ethylidenebicyclo(2.2.1)hept-2-ene, 6-methylbicyclo(2.2.1)hept-2-ene, 5,6-dimethylbicyclo(2.2.1)hept-2-ene, 1-methylbicyclo(2.2.1)hept-2-ene, 6-ethylbicyclo(2.2.1)hept-2-ene, 6-butylbicyclo(2.2.1)hept-2-ene, 6-isobutylbicyclo(2.2.1)hept-2-ene, 7-methylbicyclo(2.2.1)hept-2-ene, tetracyclo(4.4.0.1$^{2,5}$.1$^{7,10}$)-3-dodecene, 8-ethyltetracyclo(4.4.0.1$^{2,5}$.1$^{7,10}$)-3-dodecene, 8-propyltetracyclo(4.4.0.1$^{2,5}$.1$^{7,10}$)-3-dodecene, 8-hexyltetracyclo(4.4.0.1$^{2,5}$.1$^{7,10}$)-3-dodecene, 8-stearyltetracyclo(4.4.0.1$^{2,5}$.1$^{7,10}$)-3-dodecene, 8,9-dimethyltetracyclo(4.4.0.1$^{2,5}$.1$^{7,10}$)-3-dodecene, 8-methyl-9-ethyltetracyclo(4.4.0.1$^{2,5}$.1$^{7,10}$)-3-dodecene, 8-chlorotetracyclo(4.4.0.1$^{2,5}$.1$^{7,10}$)-3-dodecene, 8-bromotetracyclo(4.4.0.1$^{2,5}$.1$^{7,10}$)-3-dodecene, 8-fluorotetracyclo(4.4.0.1$^{2,5}$.1$^{7,10}$)-3-dodecene, 8,9-dichlorotetracyclo(4.4.0.1$^{2,5}$.1$^{7,10}$)-3-dodecene, 8-cyclohexyltetracyclo(4.4.0.1$^{2,5}$.1$^{7,10}$)-3-dodecene, 8-isobutyltetracyclo(4.4.0.1$^{2,5}$.1$^{7,10}$)-3dodecene, 8-butyltetracyclo(4.4.0.1$^{2,5}$.1$^{7,10}$)-3-dodecene, 8-ethylidenetetracyclo(4.4.0.1$^{2,5}$.1$^{7,10}$)-3-dodecene, 8-ethylidene-9-methyltetracyclo(4.4.0.1$^{2,5}$.1$^{7,10}$)-3-dodecene, 8-ethylidene-9-ethyltetracyclo(4.4.0.1$^{2,5}$.1$^{7,10}$)-3-dodecene, 8-ethylidene-9-isopropyltetracyclo(4.4.0.1$^{2,5}$.1$^{7,10}$)-3-dodecene, 8-ethylidene-9-butyltetracyclo(4.4.0.1$^{2,5}$.1$^{7,10}$)-3-dodecene, 8-n-propylidenetetracyclo(4.4.0.1$^{2,5}$.1$^{7,10}$)-3-dodecene, 8-n-propylidene-9-methyltetracyclo(4.4.0.1$^{2,5}$.1$^{7,10}$)-3-dodecene, 8-n-propylidene-9-ethyltetracyclo(4.4.0.1$^{2,5}$.1$^{7,10}$)-3-dodecene, 8-n-propylidene-9-isopropyltetracyclo(4.4.0.1$^{2,5}$.1$^{7,10}$)-3-dodecene, 8-n-propylidene-9-butyltetracyclo(4.4.0.1$^{2,5}$.1$^{7,10}$)3-dodecene, 8-isopropylidenetetracyclo(4.4.0.1$^{2,5}$.1$^{7,10}$)3-dodecene, 8-isopropylidene-9-methyltetracyclo(4.4.0.1$^{2,5}$.1$^{7,10}$)-3-dodecene, 8-isopropylidene-9-ethyltetracyclo(4.4.0.1$^{2,5}$.1$^{7,10}$)-3-dodecene, 8-isopropylidene-9-isopropyltetracyclo(4.4.0.1$^{2,5}$.1$^{7,10}$)-3-dodecene, 8-isopropylidene-9-butyltetracyclo(4.4.0.1$^{2,5}$.1$^{7,10}$)3-dodecene, 5,10-dimethyltetracyclo(4.4.0.1$^{2,5}$.1$^{7,10}$)-3-dodecene, 2,10-dimethyltetracyclo(4.4.0.1$^{2,5}$.1$^{7,10}$)-3-dodecene, 11,12-dimethyltetracyclo(4.4.0.1$^{2,5}$.1$^{7,10}$)-3-dodecene, 2,7,9-trimethyltetracyclo(4.4.0.1$^{2,5}$.1$^{7,10}$)-3-dodecene, 9-ethyl-2,7-dimethyltetracyclo(4.4.0.1$^{2,5}$.1$^{7,10}$)-3-dodecene, 9-isobutyl-2,7-dimethyltetracyclo(4.4.0.1$^{2,5}$.1$^{7,10}$)-3-dodecene, 9,11,12-trimethyltetracyclo(4.4.0.1$^{2,5}$.1$^{7,10}$)-3-dodecene, 9-ethyl-11,12-dimethyltetracyclo(4.4.0.1$^{2,5}$.1$^{7,10}$)-3-dodecene, 9-isobutyl-11,12-dimethyltetracyclo(4.4.0.1$^{2,5}$.1$^{7,10}$)-3-dodecene, 5,8,9,10-tetramethyltetracyclo(4.4.0.1$^{2,5}$.1$^{7,10}$)-3-dodecene, hexacyclo(6.6.1.1$^{3,6}$.1$^{10,13}$.0$^{2,7}$.0$^{9,14}$)-4-heptadecene, 12-methylhexacyclo(6.6.1.1$^{3,6}$.1$^{10,13}$.0$^{2,7}$.0$^{9,14}$)-4-heptadecene, 12-ethylhexacyclo(6.6.1.1$^{3,6}$.1$^{10,13}$.0$^{2,7}$.0$^{9,14}$)-4-heptadecene, 12-isobutylhexacyclo(6.6.1.1$^{3,6}$.1$^{10,13}$.0$^{2,7}$.0$^{9,14}$)-4-heptadecene, 1,6,10-trimethyl-12-isobutylhexacyclo(6.6.1.1$^{3,6}$.1$^{10,13}$.0$^{2,7}$.0$^{9,14}$)-4-heptadecene, octacyclo(8.8.0.1$^{2,9}$.1$^{4,7}$.1$^{11,18}$.1$^{13,16}$.0$^{3,8}$.0$^{12,17}$)-5-docosene, 15-methyloctacyclo(8.8.0.1$^{2,9}$.1$^{4,7}$.1$^{11,18}$.1$^{13,16}$.0$^{3,8}$.0$^{12,17}$)-5-docosene, 15-ethyloctacyclo(8.8.0.1$^{2,9}$.1$^{4,7}$.1$^{11,18}$.1$^{13,16}$.0$^{3,8}$.0$^{12,17}$)-5-docosene, pentacyclo(6.6.1.1$^{3,6}$.0$^{2,7}$.0$^{9,14}$)-4-hexadecene, 1,3-dimethylpentacyclo(6.6.1.1$^{3,6}$.0$^{2,7}$.0$^{9,14}$)-4-hexadecene, 1,6-dimethylpentacyclo(6.6.1.1$^{3,6}$.0$^{2,7}$.0$^{9,14}$)-4-hexadecene, 15,16-dimethylpentacyclo(6.6.1.1$^{3,6}$.0$^{2,7}$.0$^{9,14}$)-4-hexadecene, pentacyclo(6.5.1.1$^{3,6}$.0$^{2,7}$.0$^{9,13}$)4-pentadecene, 1,3-dimethylpentacyclo(6.5.1.1$^{3,6}$.0$^{2,7}$.0$^{9,13}$)4-pentadecene, 1,6-dimethylpentacyclo(6.5.1.1$^{3,6}$.0$^{2,7}$.0$^{9,13}$)-4-pentadecene, 14,15-dimethylpentacyclo(6.5.1.1$^{3,6}$.0$^{2,7}$.0$^{9,13}$)-4-pentadecene, heptacyclo(8.7.0.1$^{2,9}$.1$^{4,7}$.1$^{1,17}$.0$^{3,8}$.0$^{12,16}$)-5-eicosene, heptacyclo(8.8.0.1$^{2,9}$.1$^{4,7}$.1$^{1,18}$.0$^{3,8}$.0$^{12,17}$)-5-heneicosene, tricycle(4.3.0.1$^{2,5}$)-3-decene, 2-methyltricyclo(4.3.0.1$^{2,5}$)-3-decene, 5-methyltricyclo(4.3.0.1$^{2,5}$)-3-decene, tricycle(4.4.0.1$^{2,5}$)-3-undecene, 10-methyltricyclo(4.4.0.1$^{2,5}$)-3-undecene, pentacyclo(6.5.1.1$^{3,6}$.0$^{2,7}$.0$^{9,13}$)-4,10-pentadecadiene, pentacyclo(4.7.0.1$^{2,5}$.0$^{8,13}$.1$^{9,12}$)-3-pentadecene, methyl-substituted pentacyclo(4.7.0.1$^{2,5}$.0$^{8,13}$.1$^{9,12}$)-3pentadecene, heptacyclo(7.8.0.1$^{3,5}$.0$^{2,7}$.1$^{10,17}$.0$^{11,16}$.1$^{12,15}$)-4-eicosene, nonacyclo(9.10.1.1$^{4,7}$.0$^{3,8}$.0$^{2,10}$.0$^{12,21}$.1$^{13,20}$.0$^{14,19}$.1$^{15,18}$)-5-pentacosene, trimethyl-substituted nonacyclo(9.10.1.1$^{4,7}$.0$^{3,8}$.0$^{2,10}$.0$^{12,21}$.1$^{13,20}$.0$^{14,19}$.1$^{15,18}$)-5-pentacosene, 5-phenyl-bicyclo(2.2.1)hept-2-ene, 5-methyl-5-phenyl-bicyclo(2.2.1)hept-2-ene, 5-benzyl-bicyclo(2.2.1)hept-2-ene, 5-tolyl-bicyclo(2.2.1)hept-2-ene, 5-ethylphenyl-bicyclo(2.2.1)hept-2-ene,5-isopropylphenyl-bicyclo(2.2.1)hept-2-ene, 1,4-methano-1,1a,4,4a-tetrahydrofluorene, 1,4-methano-1,4,4a,5,10,10a-hexahydroanthracene, cyclopentadiene-acenaphthylene adduct, 5-(α-naphthyl)-bicyclo(2.2.1)hept-2-ene, and 5-(acetoracenyl)-bicyclo(2.2.1)hept-2-ene.

9. A laminated plastic molded body according to claim 1, wherein said laminated plastic molded body is a plastic container comprising a hollow biaxially drawn blow molded body.

10. A laminated plastic molded body according to claim 9 wherein said plastic molded body is a plastic container comprising a hollow blow molded body.

* * * * *